United States Patent [19]
McVaugh

[11] Patent Number: 5,516,080
[45] Date of Patent: May 14, 1996

[54] CABLE PLACING APPARATUS

[76] Inventor: Arthur K. McVaugh, P.O. Box 800, Green Lane, Pa. 18054

[21] Appl. No.: 203,894

[22] Filed: Mar. 1, 1994

[51] Int. Cl.$^6$ .................................................... B23Q 3/08
[52] U.S. Cl. ................................................ 254/134.3 FT
[58] Field of Search ................ 254/134.3 R, 134.3 FT; 414/705; 242/86.5, 86.7; 212/188, 238, 236, 268

[56] References Cited

U.S. PATENT DOCUMENTS

| | | | |
|---|---|---|---|
| 4,447,013 | 5/1984 | Sandered et al. ................ | 254/134.3 R |
| 5,029,816 | 7/1991 | Langston ......................... | 254/134.3 FT |

*Primary Examiner*—Robert C. Watson

[57] ABSTRACT

A system for replacing cable from underground installation, comprising of first and second vehicle cooperatively in first, second and third modes of operation and located at first and adjacent cable access location respectively. The first vehicle including a capstan for pulling old cable from the first cable access location and storing pulling rope. The second vehicle is adapted to position a quantity of new cable in position to be pulled into the adjacent cable access location. Line rope is stored on the second vehicle. The first mode includes pulling old cable from the first cable access location with one end of the line rope attached to the end of the old cable at the adjacent cable access location until the one end is at the first location. The second mode including use of the line rope to retrieve the line rope with one end of the pulling rope attached thereto until the end of the pulling rope reaches the adjacent location, the pulling rope being released from the capstan in a freewheel condition. The third mode includes use of the capstan to retrieve the pulling rope to the first location while pulling new cable from the quantity of new cable from the adjacent location to the first location.

13 Claims, 7 Drawing Sheets

CABLE PLACING APPARATUS

FIELD OF THE INVENTION

This invention relates to mobile apparatus for salvaging and replacing cable, particularly, underground and overhead electrical cable. More particularly, the invention relates to a system for replacing cable from underground and overhead installations using at least two vehicles which operate cooperatively in three modes of operations at adjacent cable access locations.

BACKGROUND OF THE INVENTION

Public utilities use large amounts of underground electrical cable, such as electric power cable, telephone and telegraph cable, railroad and other public transportation cable systems, fire and police departments and traffic control signal generation cables, and the like. The preferred place of installation of cables of these type are below ground in conduits which protect the cables from weather and which do not disrupt the environment, either from an aesthetic point of view or from the very real practical problem of supporting many cables on overhead lines. Overhead lines have the further disadvantage of being susceptible to vandalism and present a real danger to the population in the event that cables fall due to accident, storms and the like.

However, even the best systems ultimately deteriorate. Underground cables either deteriorate and must be removed or replacement may be required by a cable which is either larger or which contains other features or which may be made from a different material. Even when cables are placed underground, there is a limit to the number of cables and conduits which can effectively be placed under city streets, for example, and so it is desirable to remove old cable. In addition, the new "information net work" that is said to be coming and the extensive increase in the use of fiber optic cables has made it desirable to replace cable presently existing with larger, faster, better or otherwise different cables.

One device which has been admirably suited as a apparatus for removing cable from underground conduits is shown in U.S. Pat. No. 3,736,822. In this patent, a cable puller is mounted on truck and placed near manholes and other underground locations for removing cable and cutting it into disposable length. An improvement of that prior patent is disclosed in U.S. Pat. No. 3,799,016, in which an improved puller and an improved cutter are disclosed.

In a more recent patent, U.S. Pat. No. 5,193,785, an extensible mechanism, such as a boom, is disclosed which allows the force directed on the cable as it is being pulled from the conduit to be axial and avoid tangential stress moments. It is much more effective in removing old or deteriorated cable which may be subjected to stress that cause rupture or breakage.

Once it was realized that old cable could be removed using these types of apparatus, it was attempted to use these same mobile vehicle to install new cable in the old conduits. However, this required significant down time as heavy new cable can only be pulled into a conduit after a substantial line such as a steel wire line has been attached to the cable through the conduit. Accordingly, effective utilization of the cable pulling device was not possible since there was no way to pull the wire using that device. Moreover, substantial modification of the cable pulling mechanism for removing old cable was necessary since the steel wire and the like attached to the new cable was not appropriate for use on the cable pulling devices as designed. Since the distance between adjacent cable access locations such as manholes may be as much as eight hundred feet or more, a large quantity of pulling wire rope is necessary to be stored when the cable puller is being used to remove old cable. In addition, that pulling wire rope must be readily accessible when the new cable is being installed.

In addition to the inability of the mobile cable pulling equipment to easily serve both removal and installation functions, there has been no attempt to coordinate the activity at the adjacent cable access location or manhole. Efforts to attach the new cable to the old cable prior to removal of the old cable have not met with success due to the extreme load place on the cable pulling device and due to the inability to inspect, clean, or otherwise maintain the conduit between removal and installation of the new cable. More importantly, the old cable is not normally strong enough to sustain the load necessary to pull a new cable into place in the conduit. When a steel wire rope is attached to the end of the old cable and pulled through when the old cable is removed, a new cable can be attached to the wire rope. This again leaves about eight hundred feet of steel wire rope to be handled by a separate pulling device, since the cable removing device is not suitable for pulling wire rope.

Accordingly, it is the object of the present invention to provide a system for removing cable and for installing cable using the same apparatus.

Another object of the present invention is to provide a modified cable pulling design which is capable of both removing and installing cable using the same means for pulling the old cable and the new.

Other objects will appear hereinafter.

SUMMARY OF THE INVENTION

It has now been discovered that the above and other objects of the present invention may be accomplished in the following manner. Specifically, the invention comprises a system and apparatus for replacing cable installations by withdrawing the old cable and installing a new cable. The invention contemplates the use of two vehicles located at adjacent cable access locations such as manholes. The two vehicles cooperate in first, second and third modes of operation to accomplish the cable replacement.

In the first mode, the first vehicle pulls out the old cable using a driven pulley and capstan. A second vehicle is positioned at the adjacent location to provide a line rope, defined herein below, that is pulled through the conduit at the tail end of the old cable. Completion of this mode is followed by the second mode in which the first vehicle releases the capstan to freewheel after attaching a wire rope to the leading end of the line rope. The second vehicle then pulls the line rope back to itself, bringing the wire rope to the adjacent location. The second vehicle is, of course, provided with the new cable on a reel. Finally, the third mode includes the re-engagement of the driven pulley and capstan to retrieve the wire rope, thereby pulling the new cable off of the second vehicle and into place in the conduit. In this manner, the system serves to replace the old cable with the new cable.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
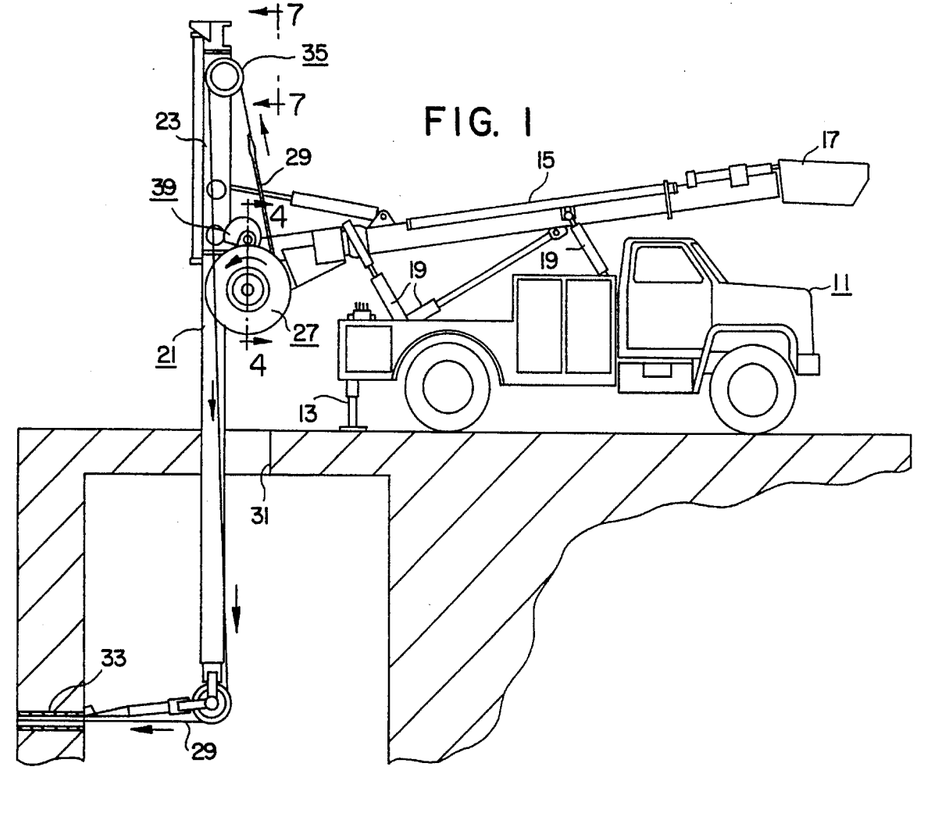
FIG. 1 is a semi-schematic, side elevational view of first vehicle having an hydraulically actuated telescoping boom, equipped with a cable pulling and scrapping device which has been modified to incorporate a cable placing mechanism in conjunction with the pulling and scrapping of old cable.
Figure 2:
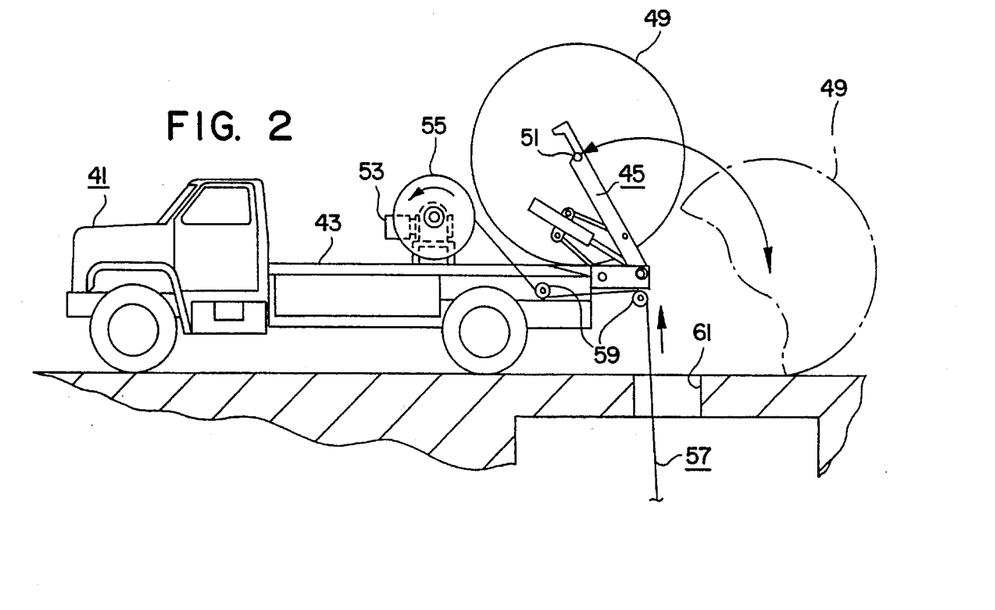
FIG. 2 is a semi-schematic, side elevational view of a second vehicle including a cable reel supply and lift mechanism and a line reel which is driven by a hydraulic motor.

As shown in FIGS. 1 and 2 the invention comprises a system shown generally. One part of the system is a first vehicle 11, which includes an actuating means having a power mode and a free wheeling mode which is responsible for pulling cable to the vehicle and allowing wire cable to be withdrawn, all as described herein below. The truck is stabilized by support jacks 13 and includes a cable removing boom 15 which has a cable cutting means 17 on its outer terminal edge. Previously discussed U.S. Pat. No. 3,799,016 is one example of a cable removal boom 15 and cable cutting means 17 which may be employed in the present invention. The boom 15 is stabilized and positioned with various hydraulic pistons 19 which are operated in a conventional manner from a control console.

In some instances, the cable is removed by a device shown in previously identified U.S. Pat. No. 3,799,016 and the present invention is contemplated for use with such a device. Preferably, however, it is contemplated that the salvage apparatus shown in U.S. Pat. No. 5,193,785 will be employed in which a boom assembly 21 and housing 23 are employed to position a sheave at a point within the cable access location. The pulling wire rope or winch line 29 is transported to and from the truck around sheave 25 by capstan 27, sheave 65 disposed adjacent vehicle 11 and axial conduit 33 to provide horizontal movement of cable or line through conduit 33. Capstan 27 is designed to incorporate sufficient wire rope 29 to permit passage of rope 29 from the first cable access location to an adjacent cable access location via manhole 31 and conduit 33 having first and second ends as will be described herein below. A pulley 35 is mounted on the top of housing 23 of boom assembly 21 to define a preferred path for the rope 29 and, as will be described herein below, to serve a function in the rewinding step of rope 29 on to capstan 27. Also as will be explained herein below, wedge element 39 assists in the transfer of cable both to and from the vehicle 11.

As shown in FIG. 2, the second vehicle 41 includes a platform on which is mounted a hydraulic lift system 45 which engages the shaft of reel 49 containing new cable 47 to lift the reel 49 from a storage position on the platform of second vehicle 41 to a dispensing position so that the new cable 47 can enter and exit the second conduit end in a substantially vertical direction. It has been the practice in this industry to deliver cable to a location on a reel such as reel 49 which can be left at the location until needed.

Hydraulic lift 45 engages shaft 51 of reel 49 and lifts it into position on platform 43. Also mounted on platform 43 is a hydraulic motor 53 having a reduction box. Motor 53 is operable to drive reel 55. Reel 55 stores a sufficient quantity of line rope or tag line 57 to reach from the location of truck 41 at manhole 61 to the location of truck 11 at manhole 31. This distance may be up to eight hundred feet more in some city streets. Line rope 57 is positioned by pulleys 59 carrying tag line removably carried thereon to enter and exit manhole 61 in a substantially vertical direction.

FIG. 3A–G illustrate the operation of the system of this invention, through its beginning to its completion, through three modes of operation as described herein. As previously described, first truck 11 and second truck 41 are positioned proximate manholes 31 and 61 respectively for the purpose of removing old cable and installing new cable. Wire rope 29, a strong pulling rope fabricated from steel wire or the like, is attached to the leading terminal end of an old cable 37 located in conduit 33. Synthetic materials such as nylon or other high tensile strength materials may also be used.

Figure 3A:
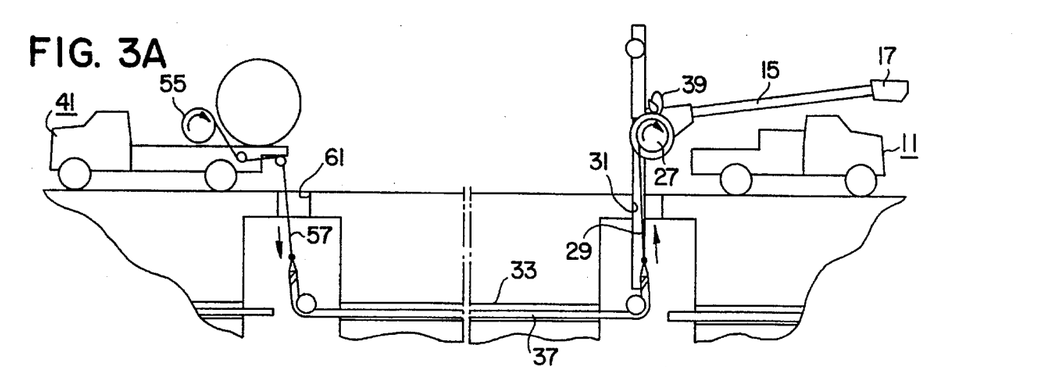
FIGS. 3A–G are semi-schematic, side elevational views sequentially illustrating the system of the present invention employing both vehicles for the removal of an old cable and the placement of a new cable in one continuous operation.
Figure 3B:
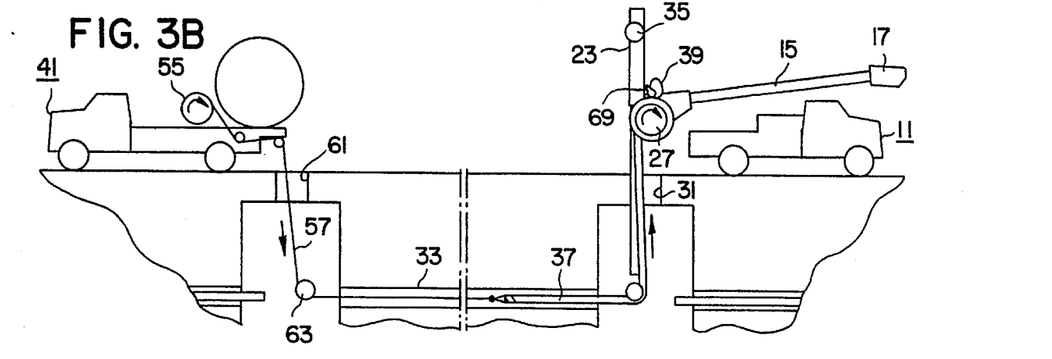
Figure 3C:
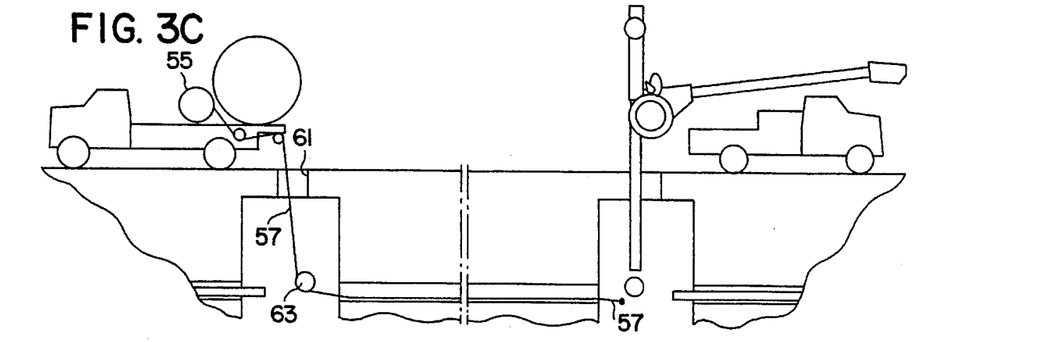
Figure 3D:
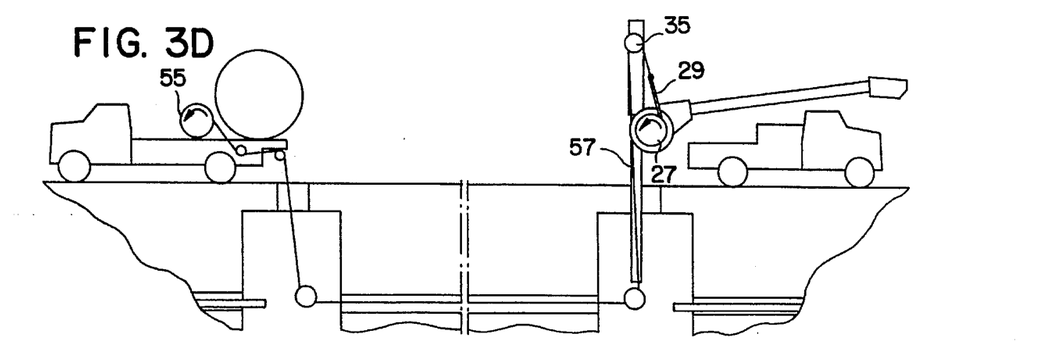
Figure 3E:
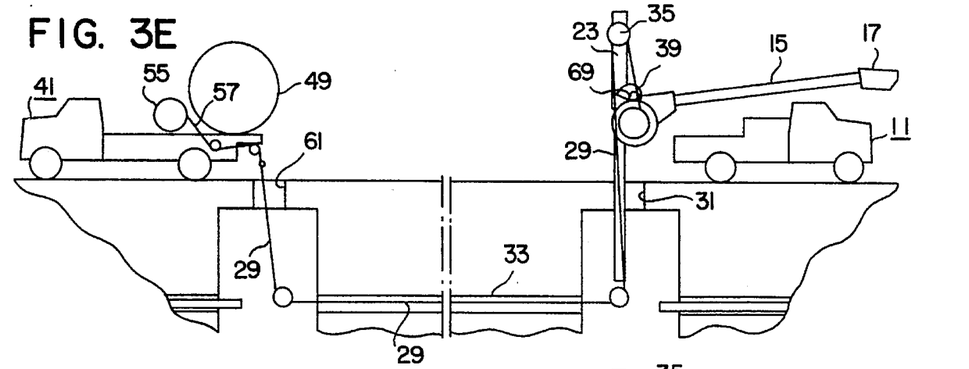

Capstan 27 rotating in a clockwise direction as shown in FIG. 3A pulls cable 37 up to the cable removal boom 15. Wedge device 39 engages the cable 37 in the pulley portion of capstan 27 and the removed old cable traverses cable removal boom 15 to be cut by cable cutting means 17 into useable pieces which fall into a dump truck, not shown. At the same time that old cable 37 is removed, line 57, a light gauge rope of metal wire or synthetic rope held by reel 55, is attached to the old cable 37 and pulled through conduit 33, as shown in FIG. 3. Reel 55 acts as a free wheeling reel and line rope 57 enters conduit 33 after passing around sheave 63 to provide a direct horizontal path for the line rope through conduit 33. Once the line rope 57 has reached the location where truck 11 is stationed and all of the remaining old cable 37 has been processed by truck 11, as shown in FIG. 3C, line rope 57 is then passed over boom pulley 35 and is attached to wire rope 29 by means for attaching winch line 29 to the tag line 57. The motor driven reel 55 is then actuated to turn reel 55 into a counterclockwise direction as shown in FIG. 3D, to pull line rope 57 back to reel 55. This pulls wire rope 29 completely through conduit 33 to a point approximate reel 49 as shown in FIG. 3E.

Figure 3F:
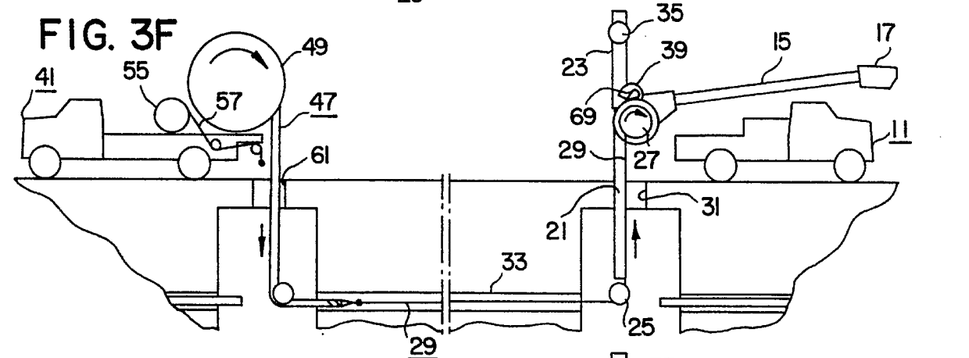
Figure 3G:
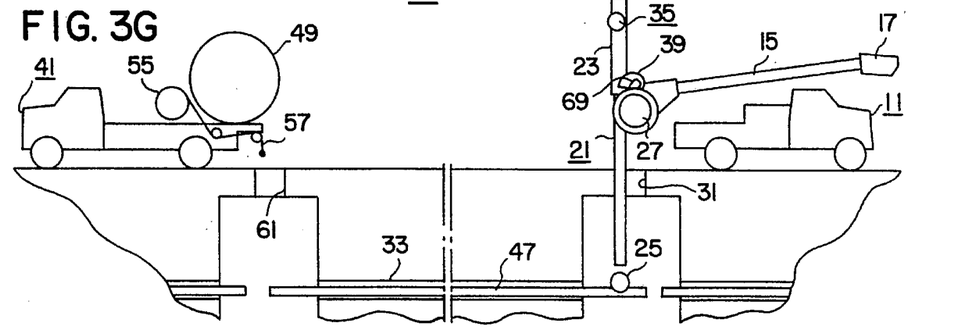

The new cable 47 is then attached to wire rope 29 by means for attaching new cable 47 to winch line 57 after line rope 57 has been detached from wire rope 29 as shown in FIG. 3F. Capstan 27 pulls line rope 29 back onto itself around sheave 25 and out of manhole 31, over the boom pulley 35 which functions, as described below, to distribute wire rope 29 evenly on capstan 27. New cable 47, which is attached to wire rope 29 is, as shown in FIG. 3G, finally in place for attachment and use.

As can be seen, the two vehicles 11 and 41 function together cooperatively in three modes. The first mode pulls old cable from a first cable access location while also transferring a line rope from the second or adjacent cable access location through the conduit to the first location. The second mode includes operation of the line rope to retrieve the wire rope, with one end of the line rope attached to a wire rope which is released by the capstan on the first truck in a freewheel condition. The third mode includes operation of the capstan to retrieve the wire rope and, at the same time, pull new cable from the adjacent location to the first location. The system is admirably suited for rapid and efficient replacement of underground cable.

Figure 4:
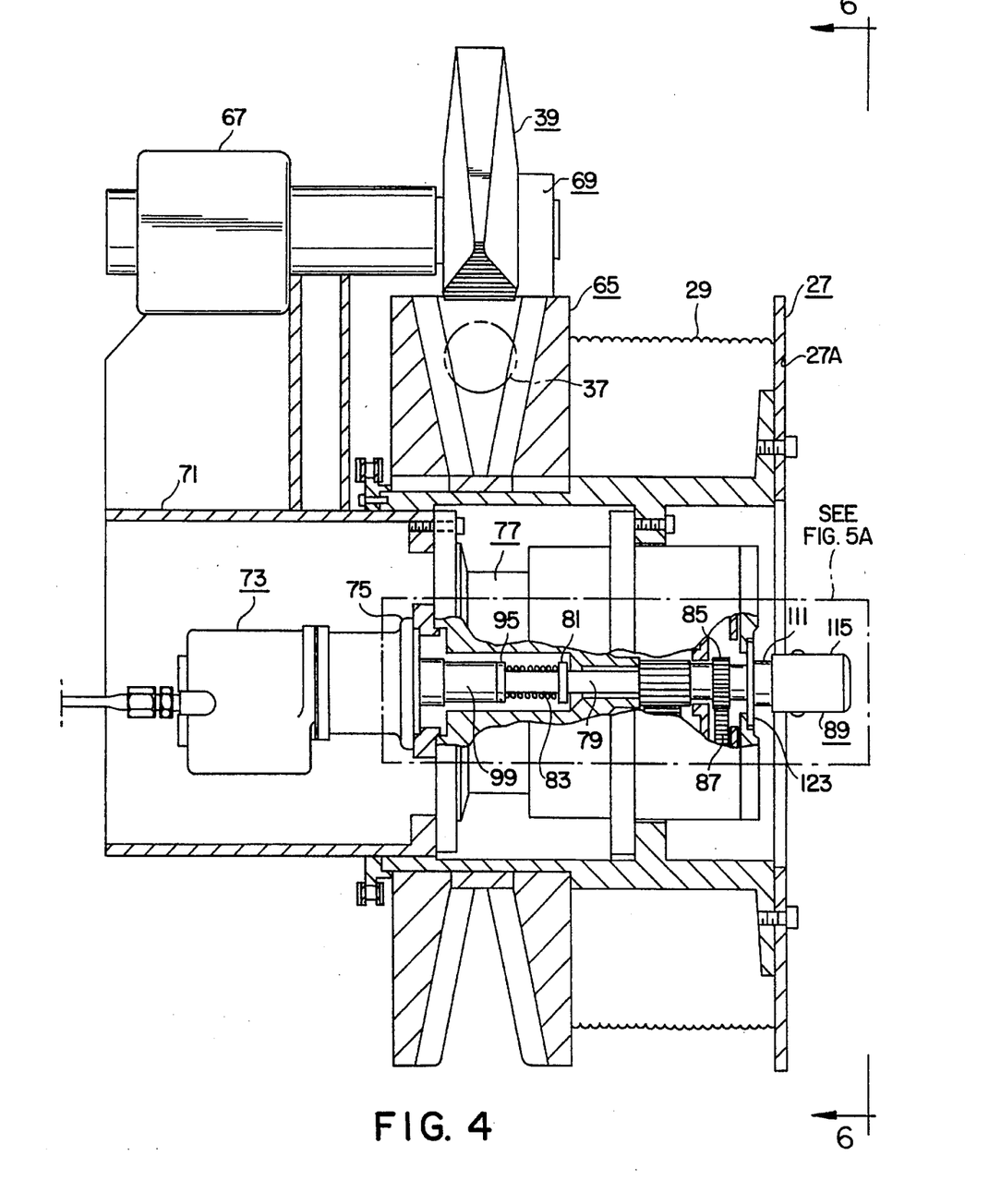
FIG. 4 is an enlarged, transverse, sectional, elevational view taken along the line 4—4 of FIG. 1, showing details of a cable pulling sheave and pulling wire capstan.

In order to accomplish the objects of the present invention, it has been found that the preferred embodiment includes the use of a novel capstan which permits a power operated pulling of old cable, for example, or rewinding wire rope onto the first vehicle while also permitting virtually effortless removal of the wire rope from the capstan when the wire rope is pulled by the line rope forming part of the second vehicle. As shown in FIG. 4, the capstan 27 has a quantity of wire rope 29 located between the flange portion 27A of the capstan and the cable sheave 65. The sheave 65 functions to engage the old cable 37 and pull it as previously described. Wedge 39 is driven into the cable 37 by motor 67 to further compress cable 37 and increase the frictional engagement between the sheave 65 and the cable 37. Also mounted on wedge 39 and driven by hydraulic motor 67 in the opposite direction is brake 69, functioning as described herein below.

As also as shown in FIG. 4, the motor housing 71 houses hydraulic motor 73, which motor interfaces with the drive mechanism via mounting in plate 75 to engage a transmission 77, which in turn drives the capstan 27. The main shaft 79 of transmission 77 is driven, as described below, by motor 73. A collar 81 locates a biasing spring 83 to keep an axial force on the interface between motor 73 and transmission 77 through main shaft 79. Sun gear 85 is driven by main shaft 79, and planetary gears 87 are in turn driven by the sun gear 85. This combination of motor 73 and transmission 77 operates to drive the sheave 65 when the device is used to pull cable toward the capstan 27. Removing cable from capstan 27 requires rotation in the opposite direction from the direction of rotation to drive the sheave. The present invention therefore contemplates that capstan 27 will rotate in a freewheel condition when wire rope 29 is being removed therefrom. As will be appreciated, rotation in a freewheel condition needs control and for that reason triangular brake shoe 69 is positioned to engage the outer rim of cable sheave 65 upon operation of hydraulic motor 67.

Transmission 77 must then function both as a heavy duty pulling apparatus to withdraw cable over long distances, and must freewheel when rotated in the opposite direction to permit rapid troubled free release of wire rope 29. In accordance with the preferred embodiment of this invention, it is possible to disengage the planetary gear system of transmission 77 through the use of a manually operated disengagement actuator 89, the operation of which is more fully described in FIG. 5A and 5B.

Figure 5A:
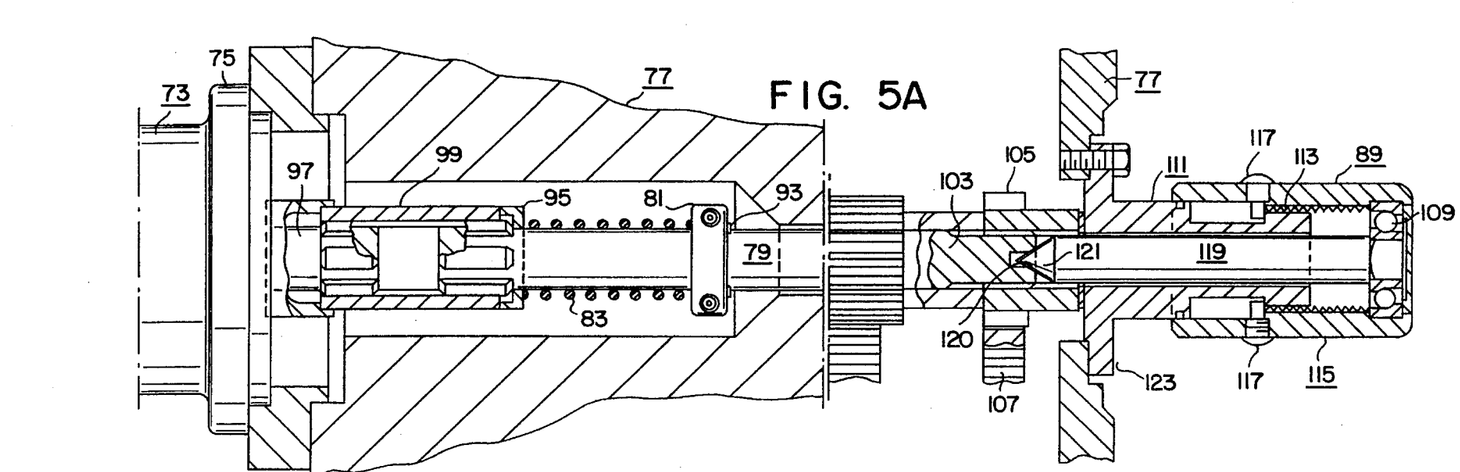
FIG. 5A is a greatly enlarged fragmentary, sectional view of the details contained within the dot and dash rectangle shown in FIG. 4 and designated FIG. 5A, with a portion of continuous detail broken away.

Turning now to FIG. 5A, details of the manually operated actuator 89 in the transmission 77 can be seen. The collar 81 which contains spring 83 on main shaft 79 also includes a retaining ring 93 since the transmission is subjected to significant stress and the nut and bolt fastener attaching the split collar 81 may, in time, loosen or fail to hold the spring in the appropriate position. A spring retainer 95 locates spring 83 between the collar 81 and the drive shaft as shown in FIG. 5A. The splined output shaft 97 of motor 73 engages splined coupling sleeve 99 which in turn engages the splined input end of shaft 79 and splined output end 103 of shaft 79, more easily seen in FIG. 5B. The output end 103 of shaft 79 engages a splined sun gear 105, which in turn drives a planetary gear such as fragment 107 of a planetary gear.

Figure 5B:
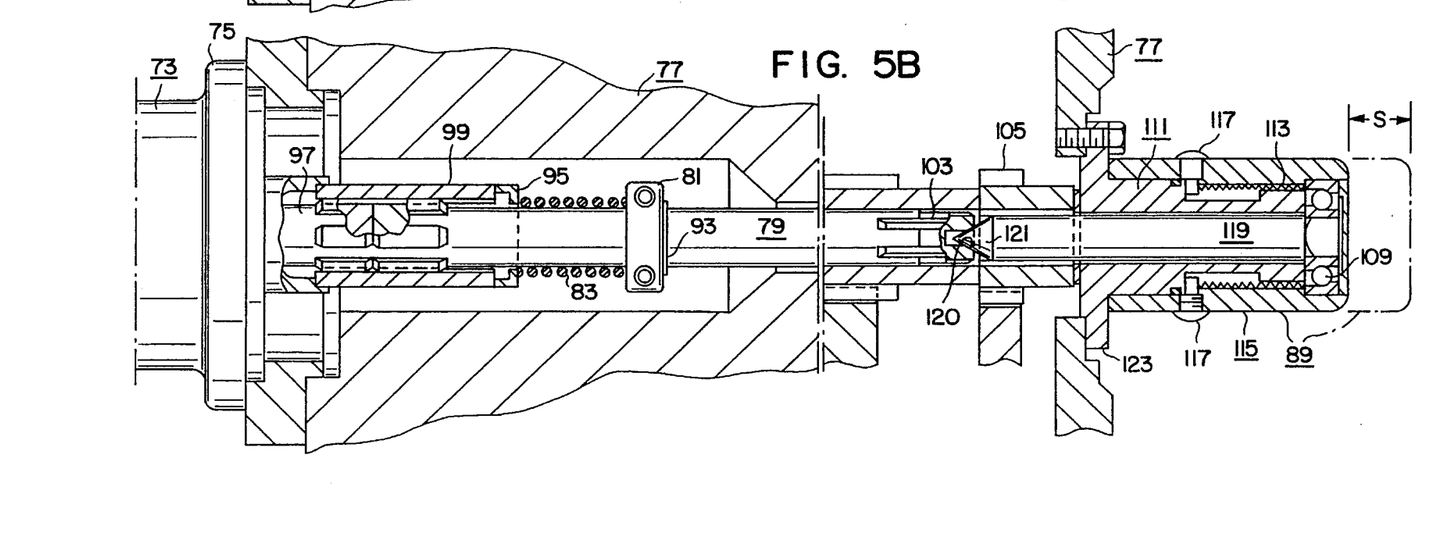
FIG. 5B is a view similar to FIG. 5A, showing instead the details in a second operating condition.

The actuator 89 includes mounting bearing 109 and a boss 111 which includes threads 113. A threaded cylinder 115 forms part of the actuator 89. Limit screws 117 limit the distance that threaded cylinder 115 can be moved along the threads 113 of boss 111. The extreme positions are shown in FIG. 5A and 5B with the letter S representing the actual distance traveled by the actuator 89. The actuator 89 has an axially extending rotatably mounted centrally located shaft 119. The outer end of the shaft 119 is press fitted in bearing 109. The other end terminates in a conical end 121. The conical end 121 is in frictional engagement with the outer terminal end of the shaft 79 and rotates in conjunction with the shaft 79. The conical end 121 of shaft 119 is always seated within an axial aligned countersunk seat 120 in the terminal end of shaft 79.

Boss 111 is also is mounted on the transmission 77 via a flange 123 forming part of boss 111. When the sheave is in the pulling mode, such as when old cable is being pulled from the conduit or when the wire rope is being retrieved, main shaft 79 engages the sun gear 105 via splines 103 and power is transmitted from the motor to the sheave as previously described. When it is desired to reverse the direction of sheave and capstan travel, the transmission 77 must operate in a freewheeling mode not transmitting power from the motor to the gear system. This is accomplished by rotation of the manually operated actuator 89 to cause the shaft 119 to push the splined output end 103 of shaft 79 out of the splined sun gear 105 to permit the free wheeling condition to exist. No power is transmitted to the sun gear.

As long as the actuator 89 remains in the free wheeling position shown in FIG. 5B, no power is transmitted from the main shaft 79 to the sun gear 105. Spring 83 is under compression between collar 81 and spring retainer 95 at all times. When the actuator 89 is rotated in the opposite direction to unthread cylinder 115 from boss 111, spring 83 forces output end 103 of shaft 79 into reengagement with the splined sun gear 105 to resume power to the transmission gears.

Figure 6:
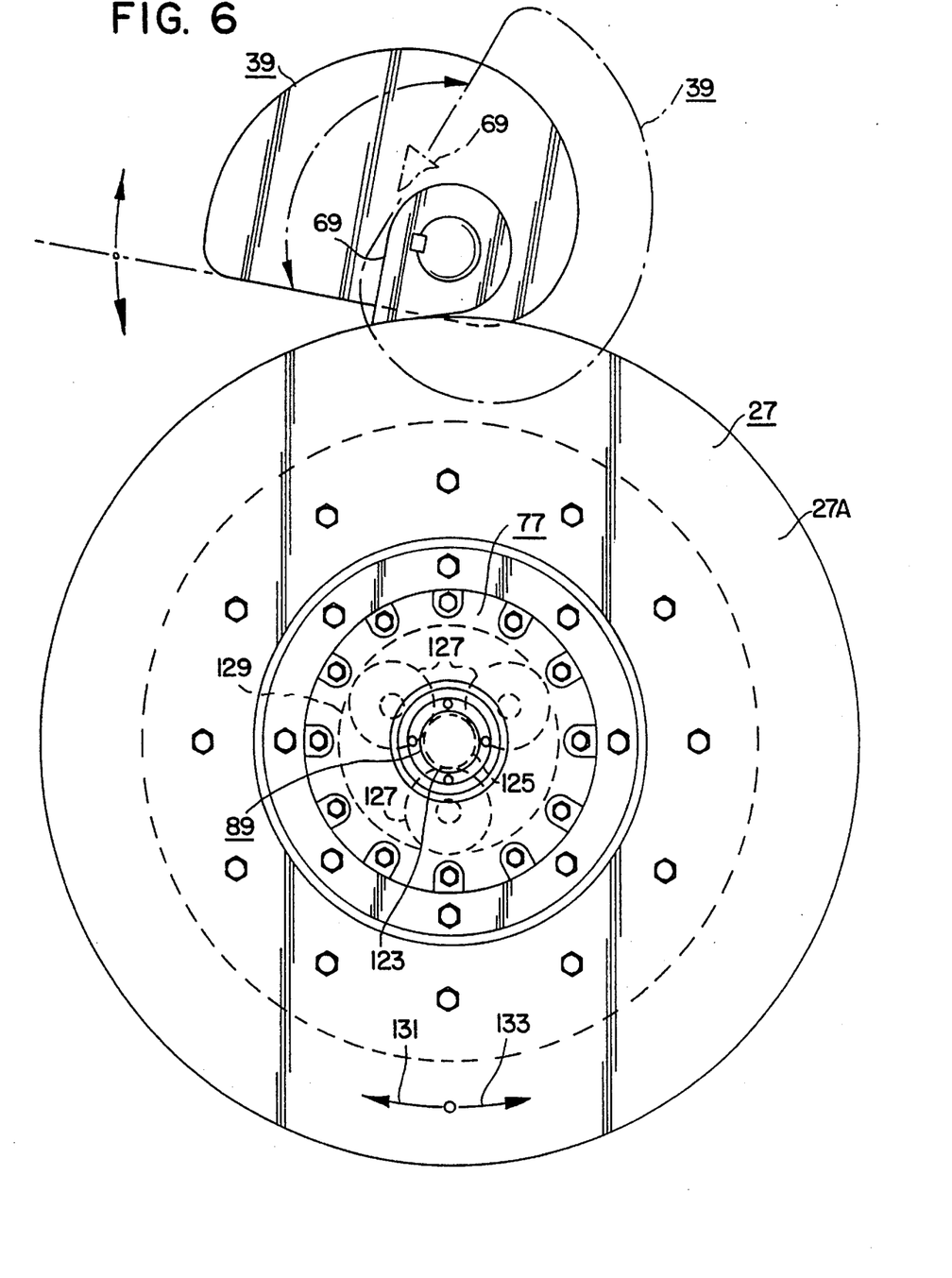
FIG. 6 is a side elevational view take along the lines 6—6 of the FIG. 4 showing additional details of the specific apparatus.

FIG. 6 illustrates additional details of the cable sheave, wire rope, capstan and the hydraulically actuated cable cam wedge and integral sheave brake. Capstan 27 is driven by the transmission as previously described, by transmission of power from the sun gear 105, shown by pitch circle 125 to the various planetary gears 127, also shown by their pitch circle, which ultimately drive a ring gear shown by pitch circle 129. When the device is operating in the cable pulling mode, capstan 27 rotates in the direction of arrow 131. Additional pressure is placed on the cable by rotation of wedge 39 as previously described, forcing the old cable further into the sheave. In the freewheeling condition illustrated by rotation in direction of arrow 133, the capstan 27 may obtain a relatively high velocity, particularly as the weight of the wire rope is removed. Brake 69 engages sheave 65, as shown in FIG. 4 and also in profile as shown in FIG. 6, although the outer surface of sheave 65 is obscured by the outer surface of capstan 27.

Figure 7:
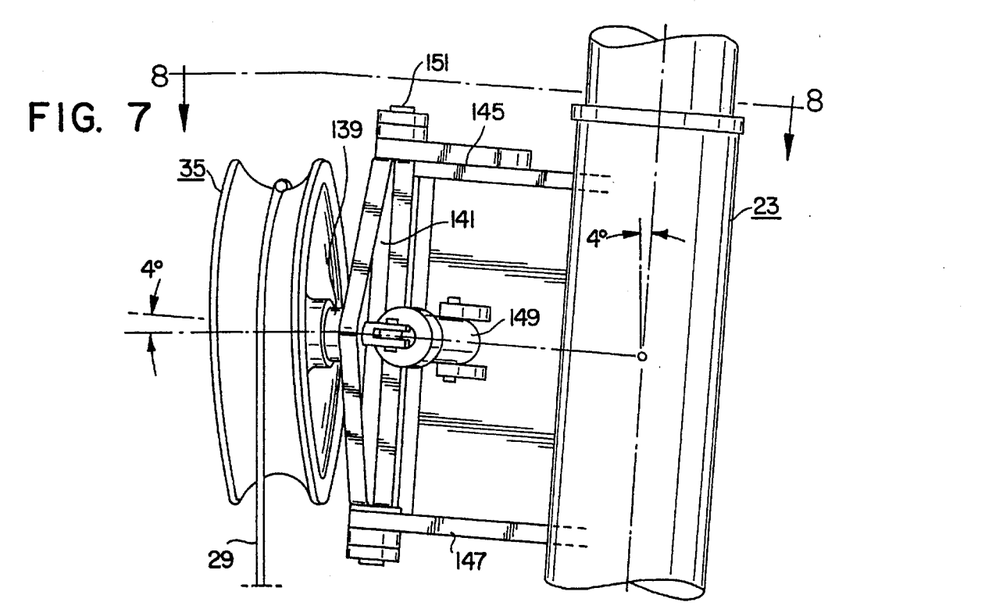
FIG. 7 is a enlarged, fragmentary, elevational view taken along the lines 7—7 of FIG. 1.
Figure 8:
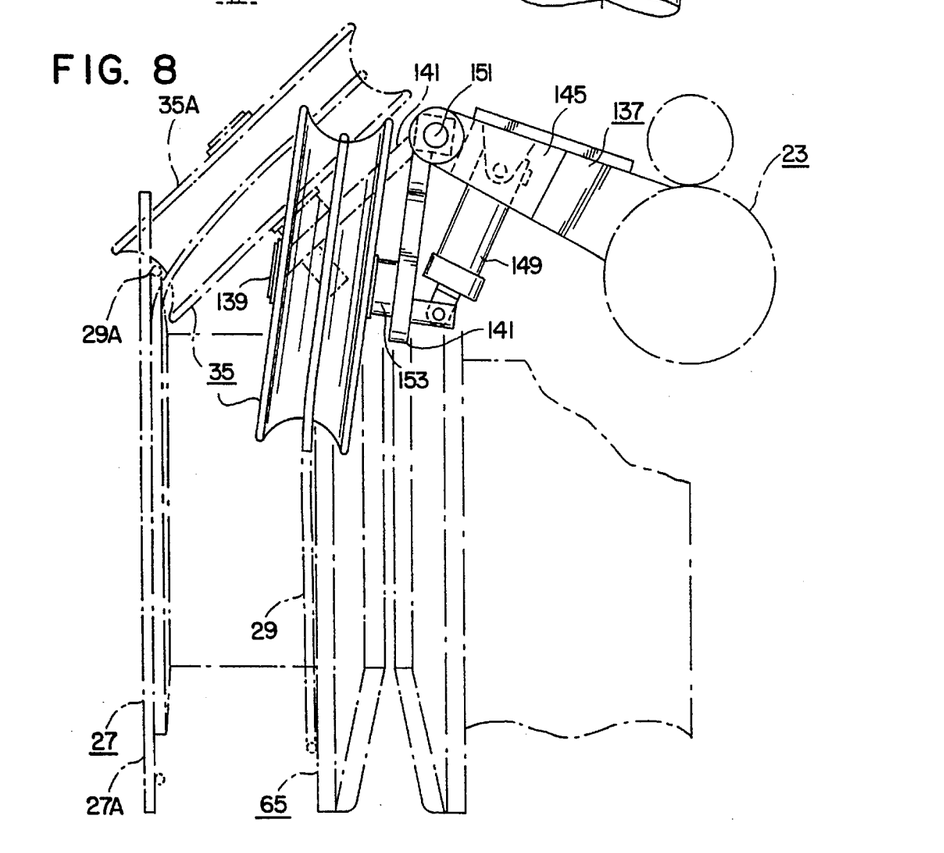
FIG. 8 is a schematic plan view taken along the lines 8—8 of FIG. 7 with a pivotally mounted vane and pulley assembly in full line overlying the cable sheave and line wire capstan shown in dot and dash line. The vane and pulley are also shown pivoted to an outer limited position in dash line.

An additional feature of the present invention provides for effective and safe distribution of wire rope 29 on capstan 27 as shown in FIG. 7. Pulley 35 is mounted on housing 23 by means of a bracket assembly 137 including shaft 139 with bearings, not shown, for pulley 35. A triangularly shaped vane body 141 is mounted on the bracket assembly 137 and includes upper arm 145 and lower arm 147. Hydraulic cylinder 149 moves triangular shape vane body 141 about a bearing mounted pivot point 151 for movement along arc 153 as shown in FIG. 8. Using hydraulic controls, the operator can move pulley wheel 35 from the position shown in FIG. 8 in solid line where rope 29 is being wrapped on capstan 27 at a point close to sheave 65. The operator can then move the pulley across the width of capstan 27 to a position shown in dot and dash line as 35A so that wire rope 29A is closest to the outer wall of the capstan 27. This embodiment provides for even and safe transfer of wire rope 29 onto and off of capstan 27.

While particular embodiments of the present invention have been illustrated and described herein, it is not intended to that they limited the invention. Changes and modification made be made therein within the scope of the following claims.

What is claimed is:

1. A system for replacing an old cable with a new cable in an underground conduit having first and second conduit ends comprising:
    a) first and second vehicles disposed proximate the first and second conduit ends, respectively;
    b) said first vehicle including actuating means comprising a power mode and a free wheeling mode;
    c) said actuating means in said power mode operable to pull one end of said old cable from the underground conduit in one direction, with a tag line attached to the opposite end of said old cable, through said underground conduit to a point where one end of said tag line is disposed adjacent to said first vehicle;
    d) means for attaching a winch line to the one end of said tag line;
    e) said actuating means in said free wheeling mode operable to permit said second vehicle including means for pulling said tag line, with said winch line attached to the opposite end of said tag line, through said underground conduit in a direction opposite said one direction to a point where the end of said winch line is disposed adjacent said second vehicle;
    f) means for attaching said new cable to said end of said winch line; and
    g) said actuating means in said power mode operable to pull one end of the said new cable through the underground conduit in said one direction, whereby said new cable is completely installed in said conduit when an end thereof is disposed adjacent said first vehicle.

2. The system of claim 1 wherein said first vehicle includes a boom for positioning a sheave disposed adjacent said first vehicle and axial said conduit to provide horizontal movement of cable or line through said conduit.

3. The system of claim 2 wherein said boom includes a pivoting means mounted for rotation along an axis parallel to said boom and perpendicular to a capstan and a pulley means to transfer winch line so that said winch line winds back and forth along said capstan to provide an evenly distributed coil for transfer therefrom or storage thereon.

4. The system of claim 1 wherein said actuating means further includes a motor connected to a plurality of shafts surroundingly engaged by plurality of gears within a housing mounted by a capstan and sheave whereby said motor drives said shafts which drive said gears which drive said housing which drives said capstan and said sheave.

5. The system of claim 4 wherein said actuating means further includes a clutch means selectively engaged to an axially extending shaft, said clutch means provides for disengagement of said axially extending shaft from a main shaft to permit free wheeling movement of said capstan during payout of said winch line.

6. The system of claim 5 which further includes brake means for engaging said sheave during disengagement of said axially extending shaft from said main shaft to control the speed of rotation of said capstan during free wheeling movement and payout of said winch line.

7. The system of claim 6 wherein said brake means comprises a brake element movable for engaging said sheave during disengagement of said axially extending shaft from said main shaft to control the speed of rotation of said capstan during free wheeling movement and payout of said winch line and for engaging said sheave during engagement of said axially extending shaft to said main shaft during a cable pulling mode to wedge cable into said sheave to increase friction between a cable and said sheave thereby more fully securing the cable on said sheave.

8. The system of claim 1 wherein said second vehicle includes a hydraulic lift system which engages the shaft of a reel containing new cable to lift said reel from a storage position on said second vehicle's platform to a dispensing position so that said new cable can enter and exit said second conduit end in a substantially vertical direction.

9. The system of claim 1 wherein said second vehicle includes a reel and a plurality of pulleys carrying tag line removably carried thereon whereby said tag line is positioned by said plurality of pulleys so that said tag line can enter and exit said second conduit end in a substantially vertical direction.

10. A method for replacing an old cable with a new cable in an underground conduit having first and second conduit ends consisting of the steps of:
    a) pulling one end of the old cable and a tag line attached to the opposite end of the old cable through the conduit in a first predetermined direction by actuating means having a power mode and a free wheeling mode;
    b) detaching the old cable from the tag line and attaching a winch line to one end of the tag line and thereafter pulling the tag line and winch line through the conduit in a direction opposite the first predetermined direction with the actuating means in a free wheeling mode until a lead end of the winch line is disposed adjacent the second conduit end; and
    c) detaching the tag line from the winch line and attaching the new cable to the one end of the winch line and thereafter pulling the winch line and the new cable through the conduit in the first predetermined direction until it is completely installed in the conduit.

11. The method of claim 10 wherein the step of pulling one end of the old cable and tag line is provided by a motor connected to a plurality of shafts surroundingly engaged by a plurality of gears within a housing mounted by a sheave and capstan whereby the motor drives the shafts which drive the gears which drives the housing which drives a capstan and a sheave.

12. The method of claim 11 further including the step of pulling of the tag line and winch line which is permitted by a clutch means selectively engaged to an axially extending shaft which provides for disengagement of the axially extending shaft from a main shaft to permit free wheeling movement of the capstan during payout of the winch line.

13. The method of claim 12 wherein the step of applying a brake force is for engaging the sheave during engagement of the axially extending shaft to the main shaft during the cable pulling mode to wedge cable into the sheave to increase friction between cable and the sheave thereby more fully securing the cable on the sheave.

* * * * *